(12) United States Patent
Zhang et al.

(10) Patent No.: US 7,969,534 B2
(45) Date of Patent: Jun. 28, 2011

(54) POLARIZING ELEMENT, POLARIZING ELEMENT MANUFACTURING METHOD, LIQUID CRYSTAL DEVICE, AND PROJECTION DISPLAY

(75) Inventors: Huiping Zhang, Suwa (JP); Yoshitomo Kumai, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/792,958

(22) Filed: Jun. 3, 2010

(65) Prior Publication Data

US 2010/0238385 A1 Sep. 23, 2010

Related U.S. Application Data

(63) Continuation of application No. 12/033,475, filed on Feb. 19, 2008, now Pat. No. 7,755,717.

(30) Foreign Application Priority Data

Mar. 7, 2007 (JP) .................................. 2007-056959

(51) Int. Cl.
*G02F 1/1335* (2006.01)
*B05D 5/06* (2006.01)
(52) U.S. Cl. ...................... 349/96; 359/486; 427/163.1
(58) Field of Classification Search .................... 349/96; 359/486; 427/163.1
See application file for complete search history.

(56) References Cited

U.S. PATENT DOCUMENTS

| 5,525,264 | A | 6/1996 | Cronin et al. |
| 7,819,997 | B2* | 10/2010 | Khanna .............................. 156/99 |
| 2002/0159160 | A1* | 10/2002 | Kayanoki ..................... 359/642 |
| 2005/0068476 | A1 | 3/2005 | Okabe |
| 2006/0216438 | A1* | 9/2006 | Nishimura et al. .......... 428/1.31 |
| 2009/0153961 | A1* | 6/2009 | Murakami et al. ............ 359/486 |

FOREIGN PATENT DOCUMENTS

| JP | 2002-520677 | 7/2002 |
| JP | 2003-519818 | 6/2003 |
| JP | 2007-003787 | 1/2007 |
| JP | 2007-017762 | 1/2007 |
| JP | 2007017762 A * | 1/2007 |
| JP | 2007-052315 | 3/2007 |
| WO | WO 00/04418 | 1/2000 |
| WO | WO 01/51964 | 7/2001 |

* cited by examiner

*Primary Examiner* — Mike Qi
(74) *Attorney, Agent, or Firm* — Harness, Dickey & Pierce, P.L.C.

(57) ABSTRACT

A polarizing element manufacturing method includes (a) forming a plurality of fine metal wires by forming a metal film on a substrate and patterning the metal film, (b) applying, onto a base material, a glass precursor solution for forming a protective layer for protecting the fine metal wires, (c) placing the substrate on the base material so that ends of the fine metal wires are immersed in the glass precursor solution, and (d) forming the protective layer by drying the glass precursor solution, and bonding together the base material and the substrate with the protective layer therebetween.

20 Claims, 5 Drawing Sheets

POLARIZING ELEMENT, POLARIZING ELEMENT MANUFACTURING METHOD, LIQUID CRYSTAL DEVICE, AND PROJECTION DISPLAY

CROSS-REFERENCE TO RELATED APPLICATIONS

This application is a continuation application of U.S. Ser. No. 12/033,475 filed Feb. 19, 2008 claiming priority to Japanese Patent Application No. 2007-056959 filed Mar. 7, 2007, both of which are hereby expressly incorporated by reference herein in their entirety.

BACKGROUND

1. Technical Field

The present invention relates to a polarizing element, a polarizing element manufacturing method, a liquid crystal device, and a projection display.

2. Related Art

A liquid crystal device is used as an optical modulation device in a projection display, such as a projector. Known as such liquid crystal devices are those in which a liquid crystal layer is interposed between a pair of substrates disposed to face each other. In these liquid crystal devices, electrodes for applying a voltage to the liquid crystal layer are formed between the pair of substrates. Alignment layers for controlling the alignment of liquid crystal particles when a voltage is not applied are formed between these electrodes. Known as such alignment layers are those in which the surface of a polyimide film is subject to rubbing.

On the other hand, a polarizing plate is disposed outside each of the pair of substrates (on the surfaces remote from the surfaces that face the liquid crystal layer) so that predetermined polarized light enters the liquid crystal layer. Known as such a polarizing plate is a polarizing film manufactured by extending a resin film made of an organic compound in one direction and thus orienting iodine or dichroic dye in a predetermined direction. Also known is a wire grid polarizing plate in which a grid made of a metal is laid over a transparent substrate (glass substrate). The most remarkable feature of such a wire grid polarizing plate is that the polarizing plate has excellent durability because it is made of an inorganic material. As such a wire grid polarizing plate, technologies such as JP-A-2003-519818 and JP-A-2002-520677 are disclosed.

Recently, a technology has been proposed that incorporates a wire grid polarizing plate into a liquid crystal panel rather than using it as a single unit. Such incorporation of a polarizing element greatly helps reduce parts count or enhance the functionality of a liquid crystal panel. Incidentally, it is known that the optical characteristic of a wire grid polarizing element is influenced by a material interposed between grid cells (conductors), and a material whose index of refraction is 1, that is, air (or vacuum atmosphere) is preferably interposed between the grids cells.

The above-mentioned JP-A-2003-519818 focuses attention on a material between such grid cells and can seal air (or vacuum) between the grid cells. However, if the polarizing element disclosed in JP-A-2003-519818 is disposed in a cell, a cover glass must be provided in only a pixel region. Further, the disposition of the cover glass increases the thickness of the cell. These significantly reduce the feasibility of such disposition. Also, JP-A-2003-519818 does not mention a specific manufacturing method. While a technology for incorporating a wire grid polarizing element is disclosed in JP-A-2002-520677, use of the technology may reduce the optical characteristic because a planarizing layer is embedded between grid cells.

SUMMARY

An advantage of the invention is to provide a polarizing element manufacturing method, a polarizing element, a liquid crystal device, and a projection display that each have an excellent optical characteristic, as well as reduce parts count and enhance the functionality of a liquid crystal device.

According to a first aspect of the invention, a polarizing element manufacturing method includes (a) forming a plurality of fine metal wires by forming a metal film on a substrate and patterning the metal film, (b) applying, onto a base material, a glass precursor solution for forming a protective layer for protecting the fine metal wires, (c) placing the substrate on the base material so that ends of the fine metal wires are immersed in the glass precursor solution, and (d) forming the protective layer by drying the glass precursor solution, and bonding together the base material and the substrate with the protective layer therebetween.

According to the first aspect of the invention, the protective layer is formed by curing the glass precursor solution by drying, and the base material is bonded to the substrate simultaneously with the formation of the protective layer. By immersing the ends of the fine metal wires in the glass precursor solution when placing the substrate on the base material, the glass precursor solution spreads to the side surfaces of the fine metal wires by capillarity (capillary phenomenon) of the fine metal wires. At that time, the gravity of the glass precursor solution also acts simultaneously with the capillary action. Therefore, the precursor solution spreads to only the ends of the fine metal wires due to the gravity of the precursor solution. As a result, the pitches between the fine metal wires are not reduced by the glass precursor solution, and the base material and the fine metal wires are bonded together easily and reliably. The spread of the glass precursor solution will be described in detail later.

Mutual action of the capillarity (capillary phenomenon) of the fine metal wires and the gravity of the glass precursor solution allows formation of spaces (cavities) enclosed by the substrate, the protective layer, and the fine metal wires. Thus, air (or vacuum) is sealed in the spaces enclosed by the substrate, the protective layer, and the fine metal wires, thereby allowing a polarizing element having an excellent optical characteristic to be obtained.

The polarizing element manufacturing method according to the first aspect of the invention preferably further includes (e) eliminating the base material from the protective layer. The base material is preferably made of an organic material.

According to this manufacturing method, the polarizing element is slimmed out since the base material made of the organic material is eliminated from the protective layer. Therefore, incorporation of such a polarizing element into a liquid crystal panel greatly helps slim out the apparatus as a whole. Also, eliminating the base material made of the organic material from the protective layer allows a polarizing element having excellent thermal resistance and excellent light stability to be obtained.

In the polarizing element manufacturing method according to the first aspect of the invention, the base material is preferably made of an inorganic material.

According to this manufacturing method, the glass precursor solution is integrated with the base material made of the inorganic material, whereby the mechanical strength is improved. Use of the inorganic material allows a polarizing element having excellent light stability and excellent thermal resistance to be obtained. Such a polarizing element is preferably used as the light valve of a projector or the like.

In the polarizing element manufacturing method according to the first aspect of the invention, the glass precursor solution for forming the protective layer is preferably formed by dispersing inorganic oxide fine particles in a dispersion solvent including a silane compound.

According to this manufacturing method, a protective layer having a high surface height and high corrosion resistance while maintaining transparency is obtained, since the glass precursor solution for forming a protective layer is formed by dispersing inorganic oxide fine particles in a dispersion solvent including a silane compound. Also, precision and adhesiveness (bonding characteristic) to the fine metal wires are improved.

According to a second aspect of the invention, a polarizing element includes: a substrate; a plurality of fine metal wires provided on the substrate; and a protective layer provided on the fine metal wires, the protective layer being formed by curing a glass precursor solution in which ends of the fine metal wires are immersed. A region enclosed by the adjacent fine metal wires, the substrate, and the protective layer is a space.

According to the polarizing element according to the second aspect of the invention, a polarizing element having an excellent optical characteristic is obtained since it has the spaces enclosed by the adjacent fine metal wires, the substrate, and the protective layer. Also, by curing the glass precursor solution in a manner that the ends of the fine metal wires are immersed in the glass precursor solution, the protective layer and the fine metal wires are integrated, whereby these are securely coupled.

In the polarizing element manufacturing method according to the second aspect of the invention, the glass precursor solution is preferably formed by dispersing inorganic oxide fine particles in a dispersion solvent including a silane compound.

According to this configuration, a protective layer having a high surface height and high corrosion resistance while maintaining transparency is obtained, since the glass precursor solution for forming a protective layer is formed by dispersing inorganic oxide fine particles in a dispersion solvent including a silane compound.

According to a third aspect of the invention, a liquid crystal device includes the polarizing element according to the second aspect of the invention.

According to the liquid crystal device according to the third aspect of the invention, a liquid crystal device that enables high definition display is obtained. Also, use of the polarizing element in which the base material is eliminated from the protective layer allows a reduction in parts count, thereby slimming out of the device as a whole. This enhances the functionality of the liquid crystal device. The device having a configuration that the base material made of the organic material is eliminated has an excellent thermal resistance and excellent light stability. This enhances the reliability of the device.

According to a fourth aspect of the invention, a projection display includes the liquid crystal device according to the third aspect of the invention, as an optical modulation device.

According to the projection display according to the fourth aspect of the invention, a favorable optical modulation is performed. This allows high-precision and high-luminance display.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will now be described with reference to the accompanying drawings. In these drawings, the scale of each component is changed as appropriate so that each component is recognizable.

Polarizing Element

Figure 1:
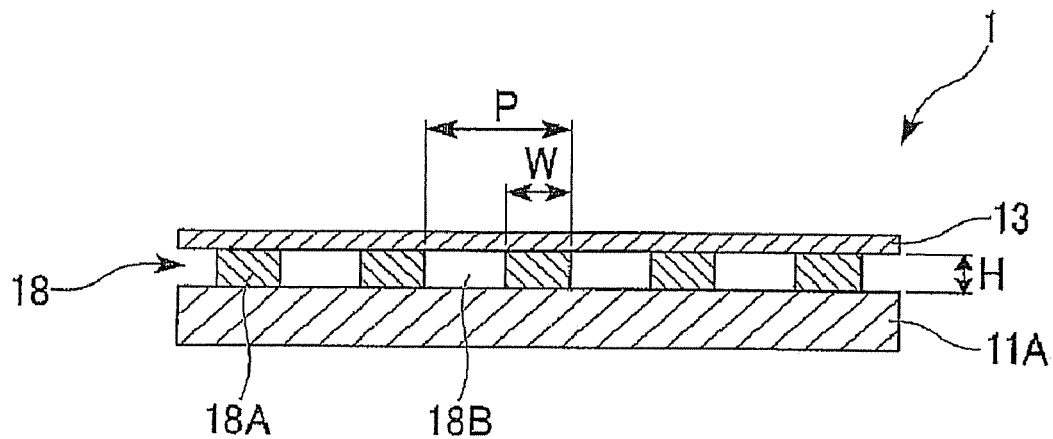
FIG. 1 is a schematic configuration diagram of a polarizing element according to one embodiment of the invention.

First, a polarizing element according to this embodiment will be described with reference to FIG. 1. FIG. 1 is a sectional view showing the polarizing element.

A polarizing element 1 includes a substrate 11A, a wire grid polarizing layer 18, and a protective layer 13 provided over the substrate 11A with the wire grid polarizing layer 18 therebetween.

The substrate 11A is made of a translucent material, such as glass or quarts. Formed on the substrate 11A are multiple metal protrusions 18A (fine metal wires) that protrude upward and are in parallel with one another.

The wire grid polarizing layer 18 includes the multiple metal protrusions 18A partially disposed on the substrate 11A. The multiple metal protrusions 18A form a stripe pattern in a plan view and each have, for example, a width W of 70 nm, a height H of 100 nm (150 nm maximum), and a pitch P of 140 nm.

The protective layer 13 is provided to protect the metal protrusions 18A, and is disposed on the upper surfaces (the surfaces remote from the substrate 11A) of the multiple protrusions. While the thickness of the protective layer is 20 to 30 nm in this embodiment, the thickness is set as appropriate according to the height, pitch, or the like of the metal protrusions 18A. The protective layer 13 is a layer formed by dispersing silica fine particles (to be discussed later) uniformly in a resin, and has a high surface height and high corrosion resistance.

In the polarizing element 1 having such a configuration, air (or vacuum) is sealed in cavities 18 enclosed by the substrate 11A, the metal protrusions 18A, and the protective layer 13.

An antireflective film (now shown) made of a dielectric multilayer film may be formed on the undersurface of the substrate 11A.

As described above, by configuring the polarizing element 1 so that it has the cavities 18B enclosed by the substrate 11A, the metal protrusions 18A, and the protective layer 13, air (or vacuum) is sealed in the cavities 18B. Setting the index of refraction between the metal protrusions 18A to 1 allows the polarizing element 1 having an excellent optical characteristic to be obtained. While a pair of glass substrates is bonded together with the wire grid polarizing layer 18 therebetween in the related art examples, the protective layer 13, instead of one of the pair of glass substrates, is provided in this embodiment. The protective layer 13 is formed so that its thickness is even smaller than that of the substrate 11A. This allows slimming out of the polarizing element 1.

Polarizing Element Manufacturing Method

Figure 2:
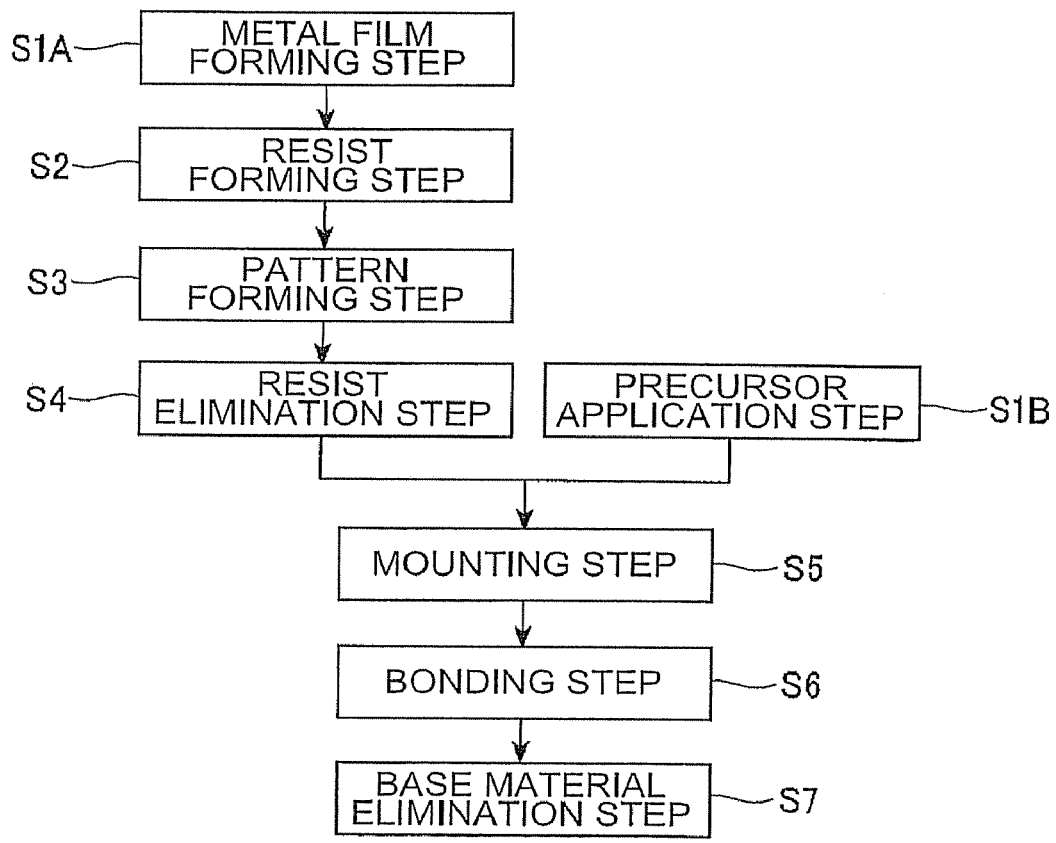
FIG. 2 is a flowchart showing a polarizing element manufacturing method according to this embodiment.

A method for manufacturing the polarizing element having the above-mentioned configuration will now be described with reference to FIGS. 2 and 3A to 3H. FIG. 2 is a flowchart showing the manufacturing process of the polarizing element, and FIGS. 3A to 3H are sectional views showing the manufacturing process of the polarizing element. FIG. 3F is an enlarged view of a main part.

The description will be made below according to the flowchart of FIG. 2 with reference to FIGS. 3A to 3H.

Figure 3A:
FIGS. 3A to 3H are process diagrams showing the polarizing element manufacturing method according to this embodiment.

In a metal film forming step S1A, as shown in FIG. 3A, a solid metal layer 12a made of aluminum (Al) is formed in the substrate 11A made of a translucent material such as glass, quartz, or plastic. Here, a film-making method such as vapor deposition or sputtering may be used. For example, gold, copper, palladium, platinum, rhodium, silicon, nickel, cobalt, manganese, iron, chrome, titanium, ruthenium, niobium, neodymium, ytterbium, yttrium, molybdenum, indium, bismuth, or an alloy of these metals may be used as the metal for forming the metal layer 12a, instead of aluminum.

A base layer (not shown) may be formed on the surface of the substrate 11A as necessary. Such a base layer may be formed of, for example, a silicon oxide film or an aluminum oxide film. It serves to prevent the substrate 11A from being damaged when the metal layer 12a is formed by etching or serves to improve the adhesiveness of the metal layer 12a. Such a base layer is formed by forming, for example, a silicon oxide film on the surface of the substrate 11A by sputtering or the like. Subsequently, the above-mentioned metal layer 12a is formed on the base layer.

Figure 3B:
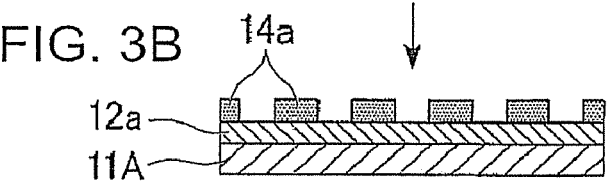

Next, in a resist forming step S2, a resist is applied onto the metal layer 12a by spin-coating and baked, so that a resist film is formed. Subsequently, the resist film is subjected to exposure and development so that linear and flat resists 14a are formed. Specifically, a laser is selectively applied onto the above-mentioned resist film so that the resists 14a are formed in the form of stripes. The pitch of the resists 14a to be formed is, for example, 140 nm. For this reason, interference exposure (here, two-beam interference exposure) is used that is able to form a fine stripe pattern equal to or shorter than the wavelength of visible light. After such exposure is performed, bake (post exposure bake (PEB)) is performed and the exposed portion of the resist film is eliminated by etching. Thus, the resists 14a having the pattern shown in FIG. 3B are formed.

Subsequently, in a pattern forming process S3, the metal layer 12a is etched with the formed resists 14a used as masks. Further, in a resist elimination process S4, the resists 14a are eliminated. Thus, the metal protrusions 18A as shown in FIG. 3C are formed.

Figure 3D:
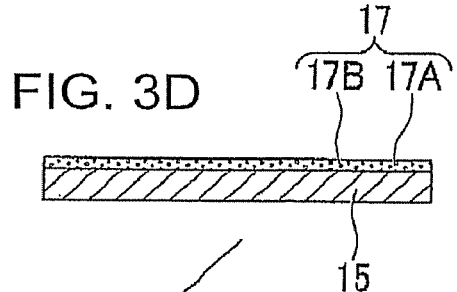
Figure 3C:
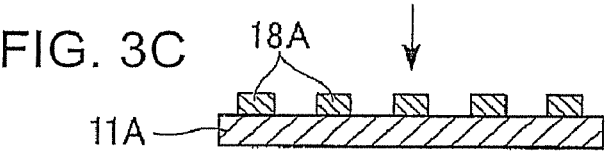

On the other hand, in parallel with above-mentioned steps S1A to S4, an organic film 15 (base material) is prepared and a glass precursor solution 17 is applied onto one surface of the organic film by spin-coating, spraying, printing, or the like in a precursor application step S1B, as shown in FIG. 3D. The amount of application is 20 to 30 nm in film thickness. If the amount of application is too small, a problem may occur in the anti-corrosiveness of the formed protective layer or adhesiveness to the above-mentioned protrusions. If the amount of application is too large, the crack resistance of the protective layer itself may be reduced.

Glass Precursor

As shown in FIG. 3A, a glass precursor solution 17 is a mixed solution containing an organic solvent 17A (dispersion solvent) including a silane compound and inorganic oxide fine particles 17B including silica (SiO "silicon dioxide") fine particles and having identical diameters. The glass precursor solution 17 has a viscosity of $5 \times 10^{-3}$ cSt to several tens of cSt.

Isopropyl alcohol (IPA), methanol, or the like is used as the organic solvent 17A. An organic solvent containing a curing catalyst may be used under certain circumstances. Containing a curing solvent promotes curing of the glass precursor solution 17 in a bonding step S6 to be discussed later.

The content of the inorganic oxide fine particles 17B in the organic solvent 17A is a percentage such that film strength desirable as the protective layer 13 is obtained and the inorganic oxide fine particles 17B are dispersed uniformly in the organic solvent 17A.

For example, the silane compound is one represented by RSi(OR)3. Specifically, those represented by RSi(OR)3 include TEOS (tetraethoxysilane), TMOS (xysilane), ODS (octadecylsilyl), VTES (vinyltriethoxysilane), and APTES (aminopropyltriethoxysilane). Changing the type of a coupling agent allows the inorganic oxide fine particles 17B to be stably dispersed in various types of solvents.

The curing agent is not limited to a particular one if it promotes the curing reaction of the glass precursor solvent 17. The dispersion solvent may be water.

Figure 3E:
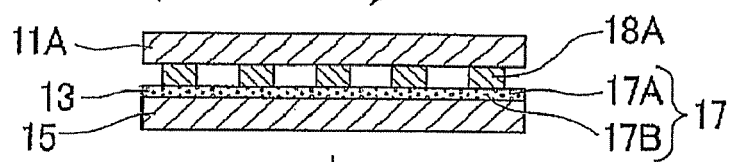

Next, in a mounting step S5, the substrate 11A is placed on the organic film 15 in a manner that the ends of the metal protrusions 18A are brought into contact with (immersed in) the glass precursor solvent 17, as shown FIG. 3E. Then, as shown in FIG. 3F, the glass precursor solvent 17 spreads to the side surfaces of the metal protrusions 18A due to a capillarity phenomenon. That is, the glass precursor solvent 17 rises along the side surfaces of the metal protrusions 18A due to force (capillarity) exerted in a direction perpendicular to a film surface 15a as surface tension of the liquid. However, the glass precursor solvent 17 only rises to the ends (portions immersed in the glass precursor solvent 17) of the metal protrusions 18A due to the balance between the capillarity and the gravity of the liquid itself. Since the metal protrusions 18A each have a width of 70 nm, a height of 100 nm, and a protrusion-to-protrusion pitch of 140 nm in this embodiment, the glass precursor solvent 17 is applied so that the application thickness is, for example, 20 to 30 nm. The amount of application of the glass precursor solvent 17 is adjusted according to the structure of the wire grid polarizing layer 18 so that the pitches between the metal protrusions 18A are not reduced by the glass precursor solvent 17 raised by capillarity.

Figure 3G:
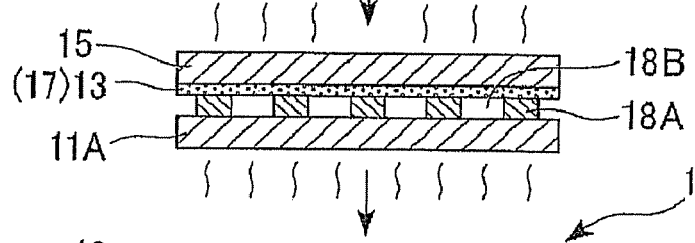

Then, in the bonding step S6, as shown in FIG. 3G, the glass precursor solvent 17 is dried at a predetermined temperature for a predetermined time period. Thus, the glass precursor solvent 17 is cured in a state in which the inorganic oxide fine particles are uniformly dispersed, so that the protective layer 13 is formed. Simultaneously with the curing of the glass precursor solvent 17, the organic film 15 and the substrate 11A are bonded together. Bonding together the organic film 15 and the substrate 11A with the protective layer 13 and the metal protrusions 18A therebetween form the cavities 18B (spaces) enclosed by the substrate 11A, the metal protrusions 18A, and the protective layer 13. Air is naturally sealed in the cavities 18B. That is, air is sealed in the cavities 18B by manufacturing in an atmosphere under atmospheric pressure. Thus, the wire grid polarizing layer 18 including the metal protrusions 18A and the cavities 18B is configured.

Vacuums may be created in the cavities 18B. In this case, the above-mentioned mounting step S5 and the bonding step S6 are performed in a vacuum atmosphere.

In this embodiment, the glass precursor solvent 17 is socalled "colloidal silica" formed by dispersing silica fine particles (inorganic oxide fine particles 17B) in the organic solvent 17A. Thus, the protective layer 13 having high hardness is obtained.

Figure 3H:
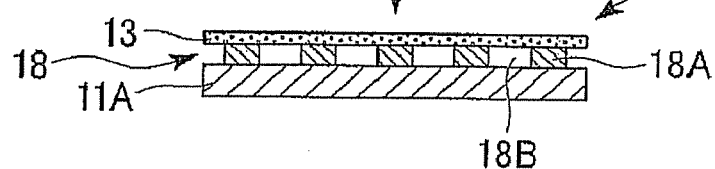
Figure 3F:
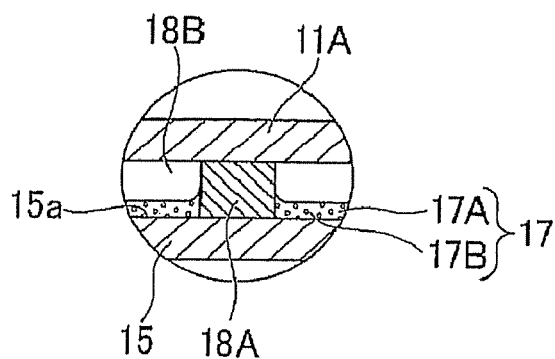

Subsequently, in a base material elimination step S7, as shown in FIG. 3H, the organic film 15 (see FIG. 3G) is eliminated from the protective layer 13. In order to eliminate the organic film 15, dissolution using an organic solvent, rapid heating using annealing, decomposition using ultraviolet irradiation, or the like is performed.

The polarizing element 1 including the wire grid polarizing layer 18 shown in FIG. 1 is manufactured by performing the above-mentioned steps.

Undergoing this process allows reliable formation of the cavities 18B between the multiple metal protrusions 18A. This allows easy formation of the wire grid polarizing element 1 having an extinction ratio higher than those of the related art examples and having an excellent polarization characteristic. According to the manufacturing method according to this embodiment, the cavities 18B are formed easily and reliably, thereby achieving simplification of the manufacturing process, improvements in yield, and reductions in cost. Also, elimination of the organic film 15 from the protective layer 13 allows slimming out of the polarizing element 1. Therefore, incorporation of the polarizing element 1 into a liquid crystal device greatly helps slim out the liquid crystal device as a whole.

Projector

Figure 4:
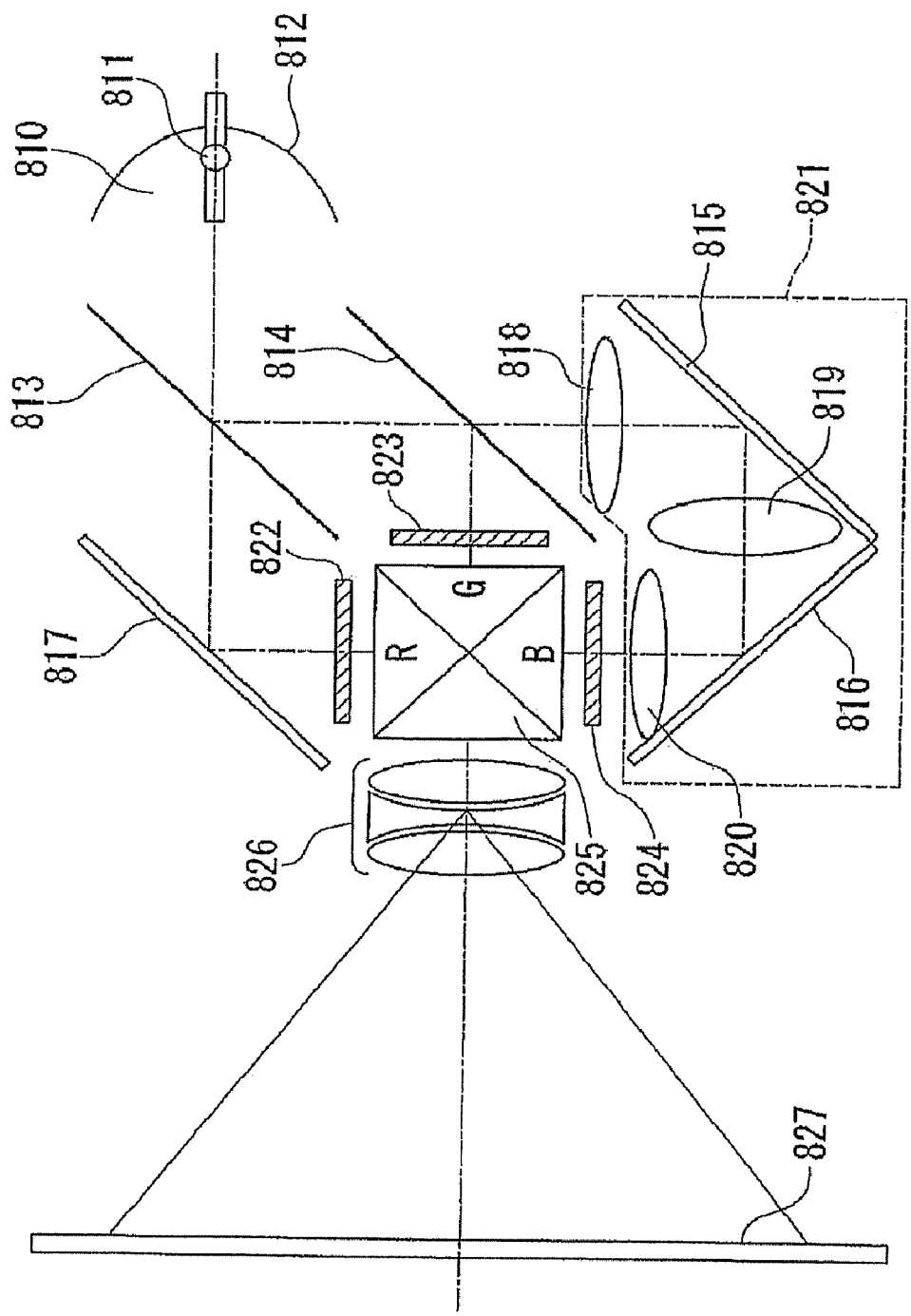
FIG. 4 is a diagram showing a projection display according to this embodiment.

FIG. 4 is a schematic configuration diagram showing a main part of a projector as a projection display according to this embodiment. The projector according to this embodiment is a liquid crystal projector using a liquid crystal device as an optical modulation apparatus.

As shown in FIG. 4, the projector according to this embodiment includes a light source 810, dichroic mirrors 813 and 814, reflection mirrors 815, 816, and 817, an incident lens 818, a relay lens 819, an outgoing lens 820, optical modulation devices 822, 823, and 824 each including a liquid crystal device, a cross dichroic prism 825, and a projection lens 826.

The light source 810 includes a lamp 811 such as a metal halide lamp and a reflector 812 for reflecting light from the lamp. In addition to a metal halide lamp, a super high pressure mercury lamp, a flash mercury lamp, a high pressure mercury lamp, a deep UV lamp, a xenon lamp, a xenon flash lamp, and the like may be used as the light source 810.

The dichroic mirror 813 transmits a red light beam contained in a white light beam from the light source 810, while it reflects a blue light beam and a green light beam. The transmitted red light beam is reflected by the reflection mirror 817 and enters the liquid crystal modulation device 822 for a red light beam. The green light beam reflected by the dichroic mirror 813 is reflected by the dichroic mirror 814 and enters the liquid crystal modulation device 823 for a green light beam. The blue light beam reflected from the dichroic mirror 813 is transmitted through the dichroic mirror 814. In order to prevent the blue light beam from suffering an optical loss due to a long optical path, there is provided light guiding means 821 including a relay lens system having the incident lens 818, the relay lens 819, and the outgoing lens 820. The blue light beam enters the liquid crystal optical modulation device 824 for a blue light beam via the light guiding means 821.

Three colored light beams modulated by the optical modulation devices 822 to 824 enters the cross dichroic prism 825. The cross dichroic prism 825 is a prism obtained by bonding four rectangular prisms together. On the interface of the cross dichroic prism 825, a dielectric multilayer film for reflecting a red light beam and that for reflecting a blue light beam are formed in the form of an X. Three colored light beams are synthesized by these dielectric multilayer films so as to form light representing a color image. The synthesized light is projected onto a screen 827 by the projection lens 826 that is a projection optics system, whereby the image is displayed in an enlarged form.

Figure 5:
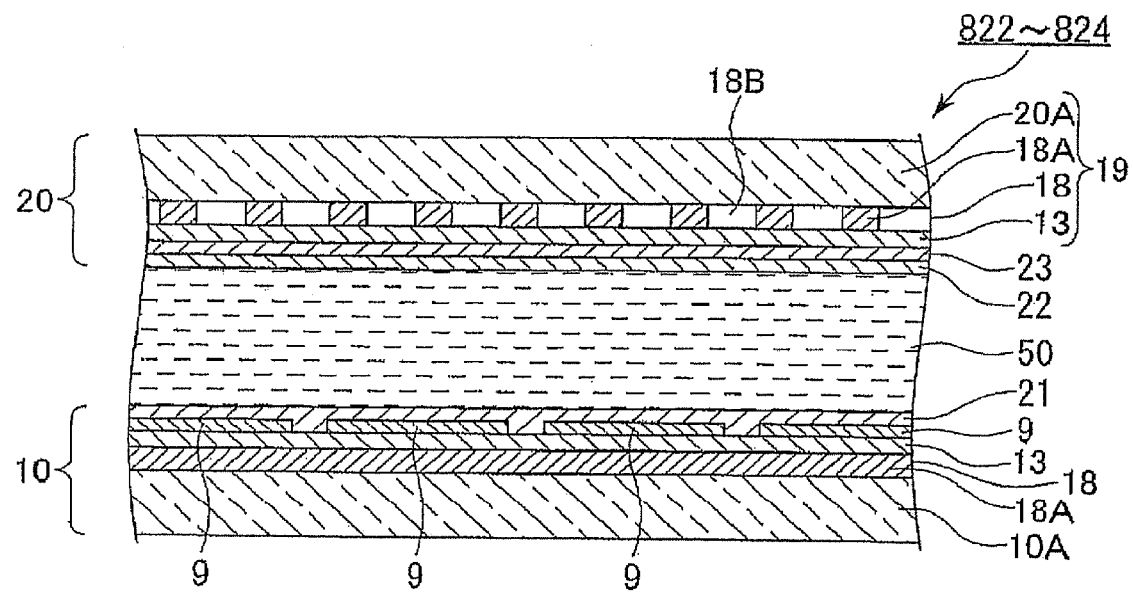
FIG. 5 is a schematic configuration diagram of a liquid crystal device according to this embodiment.

In the projector according to this embodiment, liquid crystal devices as shown in FIG. 5 are employed as the optical modulation devices 822 to 824.

Liquid Crystal Device

FIG. 5 is a schematic sectional view of the liquid crystal devices 822 to 824. In the liquid crystal devices 822 to 824, a liquid crystal layer 50 is interposed between a pair of substrates 10 and 20.

The substrate 10 is an element substrate. In the substrate 10, a wire grid polarizing layer 18, a protective layer 13, a pixel electrode 9, and an alignment layer 21 are provided on a substrate main body 10A. Also, the substrate 10 includes a thin-film transistor (TFT) element (not shown) for switching-driving the application of a voltage to the pixel electrode 9. On the other hand, the substrate 20 is a counter substrate. In the substrate 20, the wire grid polarizing layer 18, the protective layer 13, a counter electrode 23, and an alignment layer 22 are provided on a substrate main body 20A.

In this embodiment, the wire grid polarizing layer 18, the protective layer 13, and the substrate main body 10A (20A) constitute the wire grid polarizing element 19. The substrate main bodies 10A and 20A serve as substrates for a liquid crystal device and also serve as substrates for a polarizing element. The polarizing element 19 is a polarizing element manufactured using the above-mentioned polarizing element manufacturing method.

In the configuration shown in FIG. 5, the pair of substrates 10 and 20 are bonded together with a sealing material (not shown) therebetween, and liquid crystal is sealed between these substrates. While twisted nematic (TN) mode is employed as liquid crystal mode of the liquid crystal layer 50 in this case, super twisted nematic (STN) mode, electrically controlled birefringence (ECB) mode, or the like may be employed instead.

Figure 7:
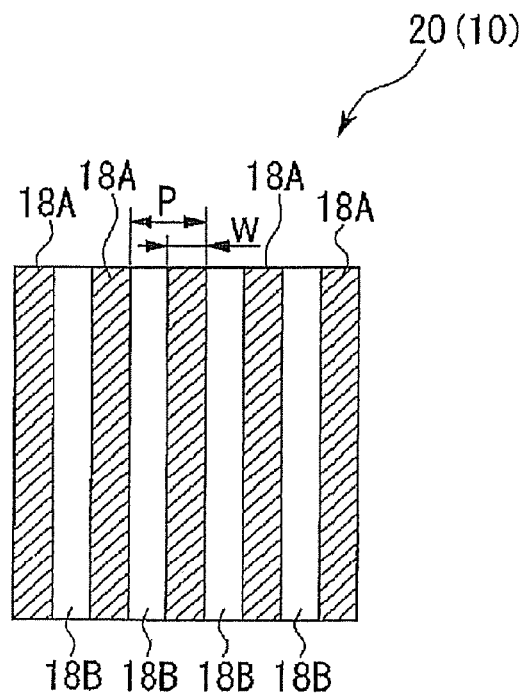
FIG. 7 is a plan view schematically showing the substrate for a liquid crystal device according to this embodiment.
Figure 8:
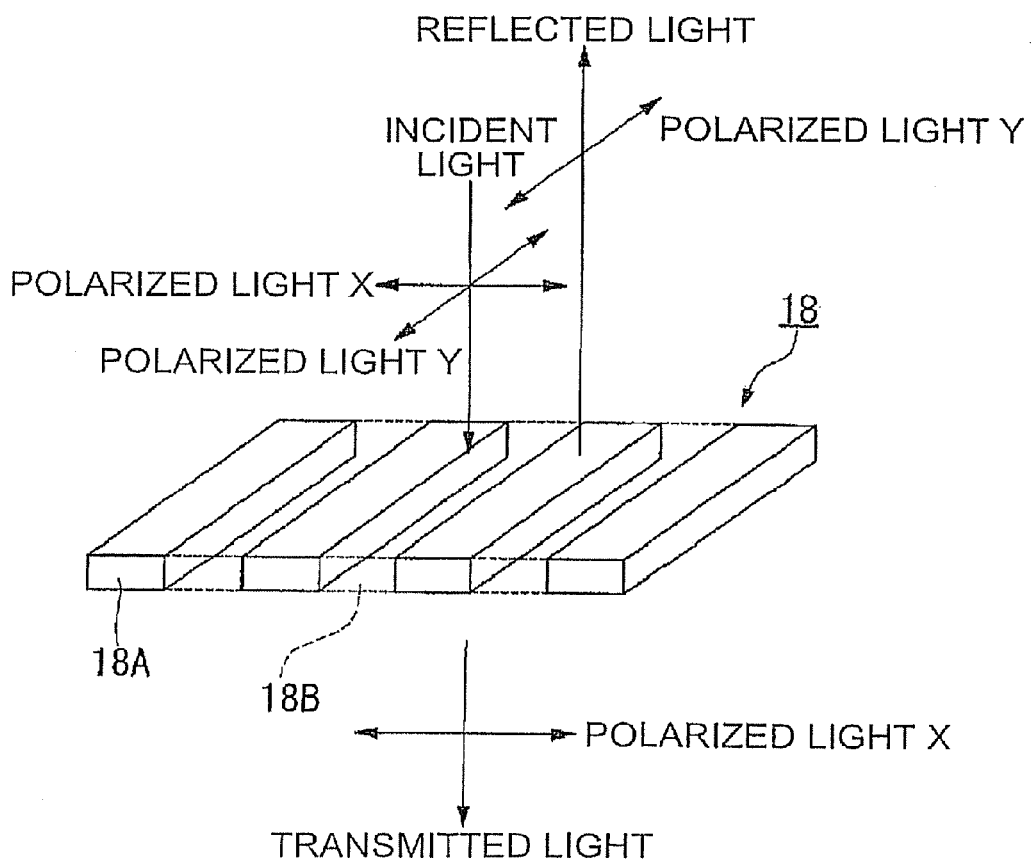
FIG. 8 is a drawing showing a function of a polarizing layer.

The configurations of the substrates 10 and 20 will be described in detail below with reference to FIGS. 6 to 8.

Figure 6:
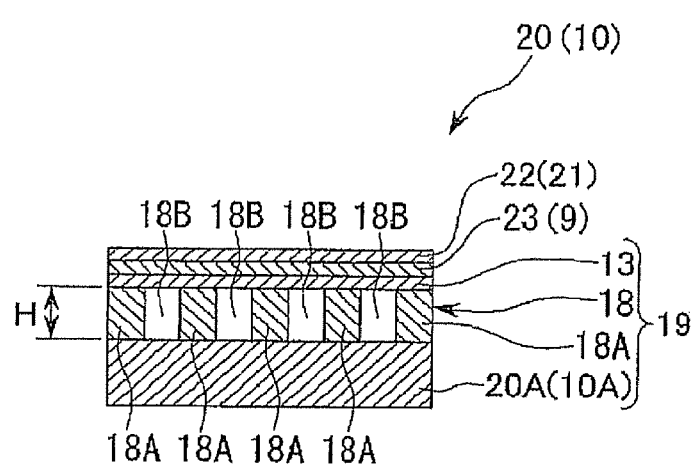
FIG. 6 is a sectional view schematically showing a substrate for a liquid crystal device according to this embodiment.

FIG. 6 is a sectional view schematically showing the substrates (substrates for a liquid crystal device) 10 and 20. FIG. 7 is a plan view schematically showing the substrates 10 and 20.

As shown in FIG. 6, in the substrates 10 and 20, the wire grid polarizing layer 18 is provided on the substrate main bodies 10A and 20A made of a translucent and dielectric inorganic material, such as glass.

The wire grid polarizing layer 18 is obtained by forming the multiple metal protrusions 18A having a strip pattern in a plan view on the substrate main bodies 10A and 20A. Specifically, as shown in FIG. 7, the metal protrusions 18 are formed in the form of strips at pitches equal to or shorter than the wavelength of incident light (that is, visible light), for example, pitches of 140 nm (indicated by P in the diagram). The width W of each of the metal protrusions 18A is set to 70 nm. Also, as shown in FIG. 6, the height H of each of the metal protrusions 18A is set to, for example, 100 nm.

As shown in FIG. 6, in the substrates 10 and 20, the protective layer 13 for covering the metal protrusions 18A is provided on the wire grid polarizing layer 18. The protective layer 13 is made of glass ceramics having SiO2 as the main ingredient, and is formed of the above-mentioned glass precursor solvent. The protective layer 13 is brought into close contact with the metal protrusions 18A formed on the substrate main bodies 10A and 20A.

According to the above-mentioned configuration, cavities are made between the metal protrusions 18A. These cavities are the cavities 18B in which air (or vacuum) is sealed. The cavities 18B are spaces enclosed by the adjacent metal protrusions 18A, the substrate main body 20A (10A), and the protective layer 13. Thus, in the wire grid polarizing layer 18, the metal protrusions 18A and the cavities 18B alternately lie in the surface direction of the substrate.

As described above, silver, gold, copper, palladium, platinum, rhodium, silicon, nickel, cobalt, manganese, iron, chrome, titanium, ruthenium, niobium, neodymium, ytterbium, yttrium, molybdenum, indium, bismuth, or an alloy of these metals may be used as the metal material forming the metal protrusions 18A, instead of aluminum.

Here, the metal protrusions 18A of the wire grid polarizing layer 18 provided in the substrate 10 and those of the wire grid polarizing layer 18 provided in the substrate 20 are disposed in a staggered manner.

Colored light beams emitted from the light source 810 are selectively polarized by the wire grid polarizing layer 18 having such a configuration so that only linearly-polarized light is transmitted through the liquid crystal layer 50.

Specifically, as shown in FIG. 5, the wire grid polarizing layer 18 includes the many metal protrusions 18A disposed at pitches shorter than the wavelength of light entering the liquid crystal layer 50 in the form of strips, as well as includes the cavities 18B that each have the index of refraction smaller those of the metal protrusions 18A and are interposed between the metal protrusions 18A. Thus, the wire grid polarizing layer 18 serves as a reflective polarizing element that reflects polarized light vibrating in a direction approximately parallel to the direction in which the metal protrusions 18A extend and transmits polarized light vibrating in a direction approximately perpendicular to the direction in which the metal protrusions 18A extend.

In other words, since the metal protrusions 18A and the cavities 18B interposed between the metal protrusions 18A have different indexes of refraction in the wire grid polarizing layer 18, selective polarization is performed according to the polarization direction of light entering the wire grid polarizing layer 18. Therefore, as shown in FIG. 8, the wire grid polarizing layer 18 transmits linearly polarized light X having a polarization axis in a direction perpendicular to the direction in which the metal protrusions 18A extend, while it reflects linearly polarized light Y having a polarization axis in a direction parallel to the direction in which the metal protrusions 18A extend.

Thus, the wire grid polarizing layer 18 has a function similar to that of a light-reflective polarizer, that is, a function of transmitting polarized light parallel to an optical axis (transmission axis) and reflecting polarized light perpendicular thereto.

Also, as shown in FIG. 6, the substrate 20 (10) includes the electrode 23 (9) disposed on the protective layer 13. The electrode 23 (9) is made of a translucent conductive material such as indium tin oxide (ITO) and its film thickness is set to the order of 50 to 100 nm (e.g., 85 nm). The common electrode 23 is solidly formed on the entire surface of the protective layer 13, while the pixel electrode 9 is formed for each pixel, thereby forming a matrix.

The alignment layer 22 (21) is formed on the electrode 23 (9). The alignment layer 22 (21) is a film formed by subjecting SiO2 to oblique deposition and controls the alignment of liquid crystal particles. The film thickness of the alignment layer 22 (21) is set to 10 to 100 nm (e.g., 25 nm).

As the material for the substrates 10 and 20 having the above-mentioned configurations, an inorganic material is used. The light source 810 including the above-mentioned metal halide lamp 811 emits light having high energy. If a substrate made of an organic material is used, it may be decomposed or deformed by such light having high energy. For this reason, substrates made of an inorganic material (including a metal material) having high light stability and high thermal resistance are used as substrates for a liquid crystal device.

As described above, in the liquid crystal devices 822 to 824 having such a configuration, linearly polarized light enters the liquid crystal layer 50 via the wire grid polarizing layer 18 incorporated into the substrate 10 (20) shown in FIG. 5, and the phase is controlled in the liquid crystal layer 50. Specifically, the liquid crystal layer 50 is drive-controlled by voltages applied to the electrodes 9 and 23, so that the phase of the incident light is controlled. As a result, the phase-controlled light is selectively transmitted through the wire grid polarizing layer 18 incorporated into the substrate 20 (10) disposed in the opposite side and modulated. In this embodiment, air (or vacuum) is sealed in the cavities 18B (spaces) enclosed by the substrates 10 and 20, the protective layer 13, and the metal protrusions 18A; therefore, an excellent optical characteristic is obtained.

In this embodiment, the polarizing element is incorporated into the liquid crystal panel; therefore, the substrate main bodies 10A and 20A serve as substrates for a liquid crystal device and also serve as substrates for a polarizing element. This reduces the parts count, thereby slimming out of the device as a whole as well as improving the functionality of the liquid crystal device. Also, the simplification of the device structure allows a reduction in cost.

As shown in FIG. 4, the colored light beams modulated by the liquid crystal devices 822 to 824 enter the cross dichroic prism 825 and are synthesized, as described above. The synthesized light is projected onto the screen 827 by the projection lens 826 that is a projection optics system, so that an image is displayed in an enlarged manner.

The above-mentioned projector 800 includes the liquid crystal devices each incorporating the polarizing element, as optical modulation means.

As described above, in the liquid crystal devices 822 to 824 according to this embodiment, the cavities 18B are formed between the metal protrusions 18A. Therefore, these devices do not cause a display failure or a reduction in reliability, as well as are energy-saving and excellent in display brightness. As a result, by including the above-mentioned liquid crystal devices 822 to 825 as optical modulation means, the projector 800 according to this embodiment serves as a highly reliable projector having an excellent display characteristic.

The technical scope of the invention is not limited to the above-mentioned embodiment and covers various modifications thereto without departing from the spirit of the invention. For example, the embodiment has been described using, as an example, the liquid crystal device including a TFT as a switching element; however, the invention is also applicable to a liquid crystal device including a two-terminal element such as a thin film diode as a switching element. Further, the embodiment has been described using, as an example, the three-plate projector (projection display); however, the invention is also applicable to a single-plate projection display or a direct-view display.

The liquid crystal device according to this embodiment is also applicable to electronic apparatuses other than projectors. Among specific examples are cellular phones. The liquid crystal device according to the above-mentioned embodiment or that according to a modification thereof is applicable to the display unit of cellular phones. Among other electronic apparatuses are integrated circuit (IC) cards, video cameras, personal computers, and head-mounted displays, and, further, fax machines provided with a display function, finders of digital cameras, portable televisions, digital signal processors, personal digital assistants, electronic notepads, electronic bulletin boards, and displays for an advertisement.

While the organic film 15 is used in the polarizing element manufacturing method according the above-mentioned embodiment, for example, a glass substrate made of an inorganic material may be used. In this case, the protective layer 13 made of the glass precursor solution 17 is formed integrally with such a glass substrate. Integrally forming the glass substrate and the protective layer allows a polarizing element having an excellent mechanical strength and excellent light stability to be obtained.

What is claimed is:

1. A polarizing element comprising:
    a substrate;
    a first metal wire and a second metal wire provided on the substrate; and
    a glass layer supported between the first and second metal wires, the glass layer and the metal wires forming a co-planar single surface defined by surfaces of the glass layer that are aligned with surfaces of the first and second metal wires,
    wherein a region enclosed by the glass layer and the metal wires is a space.

2. The polarizing element of claim 1, wherein the glass layer is formed by curing a glass precursor solution.

3. The polarizing element according to claim 2, wherein the glass precursor solution is formed by dispensing inorganic oxide fine particles in a dispersion solvent including a silane compound.

4. A liquid crystal device comprising the polarizing element of claim 1.

5. A projection display comprising the liquid crystal device of claim 4 as an optical modulation device.

6. A polarizing element, comprising:
    a substrate;
    a plurality of metal wires disposed on the substrate;
    a protective layer provided on the metal wires; and
    at least one cavity disposed between adjacent metal wires and the protective layer,
    wherein the protective layer and the metal wires form a co-planar single surface defined by surfaces of the protective layer that are aligned with surfaces of the metal wires.

7. The polarizing element of claim 6, wherein the cavity is a vacuum.

8. The polarizing element of claim 6, wherein the cavity is filled with air.

9. The polarizing element of claim 6, wherein the protective layer is a glass layer.

10. The polarizing element of claim 6, further comprising a cavity disposed between each pair of adjacent metal wires and the protective layer.

11. The polarizing element of claim 10, wherein each cavity is a vacuum.

12. The polarizing element of claim 10, wherein each cavity is filled with air.

13. A liquid crystal device comprising the polarizing element of claim 6.

14. A projector apparatus comprising the liquid crystal device of claim 13 as an optical modulation device.

15. A polarizing element, comprising:
    a substrate;
    a plurality of fine metal wirings disposed on the substrate;
    a glass layer disposed on a surface of the fine metal wirings opposite a surface of the fine metal wirings that is disposed on the substrate such that a plurality of cavities are formed between the metal wirings, the substrate, and the glass layer,
    wherein the glass layer and the fine metal wirings form a co-planar single surface defined by surfaces of the glass layer that are aligned with surfaces of the fine metal wirings.

16. The polarizing element of claim 15, wherein each cavity is a vacuum.

17. The polarizing element of claim 16, wherein each cavity is filled with air.

18. A liquid crystal device comprising the polarizing element of claim 15.

19. A projector apparatus comprising the liquid crystal device of claim 18 as an optical modulation device.

20. The polarizing element of claim 15, wherein the glass layer includes a plurality of inorganic oxide fine particles.

* * * * *